US012794225B2

(12) United States Patent
Bech et al.

(10) Patent No.: US 12,794,225 B2
(45) Date of Patent: Nov. 10, 2026

(54) DC CONTACTOR ARRANGEMENT FOR BIDIRECTIONAL POWER SWITCHING

(71) Applicant: ABB E-mobility B.V., Delft (NL)

(72) Inventors: Lars Peter Bech, Schiedam (NL); Stefan Raaijmakers, Delft (NL); Jim van-der-Heijden, Eindhoven (NL); Mengxi Zhou, Rotterdam (NL)

(73) Assignee: ABB E-Mobility B.V., Delft (NL)

( * ) Notice: Subject to any disclaimer, the term of this patent is extended or adjusted under 35 U.S.C. 154(b) by 64 days.

(21) Appl. No.: 18/428,080

(22) Filed: Jan. 31, 2024

(65) Prior Publication Data

US 2024/0258793 A1 Aug. 1, 2024

(30) Foreign Application Priority Data

Feb. 1, 2023 (EP) .................................... 23154557

(51) Int. Cl.
*H02J 1/06* (2026.01)

(52) U.S. Cl.
CPC ...................................... *H02J 1/06* (2013.01)

(58) Field of Classification Search
CPC .. H02J 1/06; B60L 53/00; B60L 53/16; B60L 53/18
See application file for complete search history.

(56) References Cited

U.S. PATENT DOCUMENTS

2010/0001582 A1* 1/2010 Newhouse .............. B60R 16/03 307/10.1
2010/0133914 A1* 6/2010 Kang ...................... B60L 58/21 307/115

FOREIGN PATENT DOCUMENTS

CN 105939023 A 9/2016
CN 109256841 A 1/2019
WO WO 2018/149152 A1 8/2018

OTHER PUBLICATIONS

European Patent Office, Extended European Search Report in European Patent Application No. 23154557.5, 7 pp. (Jul. 3, 2023).

* cited by examiner

*Primary Examiner* — Carlos Amaya
(74) *Attorney, Agent, or Firm* — McCarter & English, LLP; Michael M. Gnibus

(57) ABSTRACT

A DC contactor arrangement for bidirectional power switching includes a DC+ contactor for connecting a power source with a load, and a DC− contactor for connecting the power source with the load. At least one of the DC+ or DC− contactors is a unidirectional DC contactor. The DC+ contactor and the DC− contactor are configured to be switched at different times, when the DC+ contactor and the DC− contactor are under load.

12 Claims, 8 Drawing Sheets

| | | DC+ contactor | DC- contactor |
|---|---|---|---|
| Positive power flow (line 122) | contactor closing under load | 2 | 1 |
| | contactor opening under load | 1 | 2 |
| Negative power flow (line 124) | contactor closing under load | 1 | 2 |
| | contactor opening under load | 2 | 1 |

Switching sequence:
1 means switch firstly and 2 means switch secondly

| | | DC+ contactor | DC- contactor |
|---|---|---|---|
| Positive power flow (line 122) | contactor closing under load | 1 | 2 |
| | contactor opening under load | 2 | 1 |
| Negative power flow (line 124) | contactor closing under load | 2 | 1 |
| | contactor opening under load | 1 | 2 |

Switching sequence:
1 means switch firstly and 2 means switch secondly

| | | DC+ contactor | DC- contactor |
|---|---|---|---|
| Positive power flow (line 122) | contactor closing under load | 1 or 2 | 2 or 1 |
| | contactor opening under load | 1 or 2 | 2 or 1 |
| Negative power flow (line 124) | contactor closing under load | 2 | 1 |
| | contactor opening under load | 1 | 2 |

Switching sequence:
1 means switch firstly and 2 means switch secondly

| | | DC+ contactor | DC- contactor |
|---|---|---|---|
| Positive power flow (line 122) | contactor closing under load | 2 | 1 |
| | contactor opening under load | 1 | 2 |
| Negative power flow (line 124) | contactor closing under load | 1 or 2 | 2 or 1 |
| | contactor opening under load | 1 or 2 | 2 or 1 |

Switching sequence:
1 means switch firstly and 2 means switch secondly

| | | DC+ contactor | DC- contactor |
|---|---|---|---|
| Positive power flow (line 122) | contactor closing under load | 1 or 2 | 2 or 1 |
| | contactor opening under load | 1 or 2 | 2 or 1 |
| Negative power flow (line 124) | contactor closing under load | 1 | 2 |
| | contactor opening under load | 2 | 1 |

Switching sequence:
1 means switch firstly and 2 means switch secondly

| | | DC+ contactor | DC- contactor |
|---|---|---|---|
| Positive power flow (line 122) | contactor closing under load | 1 | 2 |
| | contactor opening under load | 2 | 1 |
| Negative power flow (line 124) | contactor closing under load | 1 or 2 | 2 or 1 |
| | contactor opening under load | 1 or 2 | 2 or 1 |

Switching sequence:
1 means switch firstly and 2 means switch secondly

DC CONTACTOR ARRANGEMENT FOR BIDIRECTIONAL POWER SWITCHING

CROSS-REFERENCE TO RELATED APPLICATIONS

The instant application claims priority to European patent application Ser. No. 23/154,557.5, filed Feb. 1, 2023, which is incorporated herein in its entirety by reference.

FIELD OF THE DISCLOSURE

The present disclosure generally relates to smart connection and switching of DC contactors in bidirectional applications and, more particularly, to a DC contactor arrangement for bidirectional power switching.

BACKGROUND OF THE INVENTION

As the number of bidirectional EV chargers increases, also the demand on economic DC contactors that are capable of safe high current switching in both directions is increased. It is known that many unidirectional DC contactors are capable to switch under load when high current flows in one direction but not in the other direction. Some bidirectional DC contactors are available, which can perform high current switching in both directions. However, such contactors are quite expensive. In addition, the selection of bidirectional DC contactors in terms of rated currents on the market today is small.

BRIEF SUMMARY OF THE INVENTION

There may be a desire to improve arrangement of DC contactors for bidirectional applications. The described embodiments pertain to the DC contactor arrangement, the electric vehicle bidirectional charging system, the method for switching a DC+ contactor and the DC− contactor for connecting the power source with the load in a DC contactor arrangement for bidirectional power switching, the use of a unidirectional contactor and the use of the DC contactor arrangement in an energy system. Synergetic effects may arise from different combinations of the embodiments although they might not be described in detail.

Further on, it shall be noted that all embodiments of the present invention concerning a method might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a DC contactor arrangement for bidirectional power switching is provided. The arrangement comprises a DC+ contactor for connecting a power source with a load, and a DC− contactor for connecting the power source with the load. At least one of the DC+ contactor or DC− contactor is a unidirectional DC contactor. The DC+ contactor and the DC− contactor are configured to be switched at different times, when the DC+ contactor and the DC− contactor are under load.

A DC contactor is a device that connects a power source with a load. The contactor receives a signal to open or close the switch, i.e. to break or to make a connection. A DC+ contactor is in the positive voltage line connecting the DC power source with the load. Correspondingly, a DC− contactor is in the negative voltage line connecting the DC power source with the load. The switching may be performed, for example, to start a charging of a vehicle at the beginning of a charging session or to stop the charging session, or in emergency cases to prevent a device from being damaged or destroyed and to prevent an injury. Although the system and the method presented herein is intended for cases where high current is switched, the system and the method may also be applied at low current flows. The term "unidirectional DC contactor" does not preclude that high current can flow in two directions, but that they are designed to switch on/off high current of currents that flow in a pre-defined direction. For example, breaking the connection in a moment, when high current flows in the reverse direction, the contactor would be at least damaged. The contactor has two terminals for the high current, which are nominated A+ and A− herein. The pre-defined direction of the unidirectional contactor therefore is from terminal A+ to terminal A−. A bidirectional contactor does not have such a limitation. It can be switched under load for high currents in any direction without damage. The term "under load" is used for either high current is flowing. A switching in this case would mean that the contactor is opened. Or, no high current is flowing at the moment, but when switching, high current will flow.

BRIEF DESCRIPTION OF THE SEVERAL VIEWS OF THE DRAWING(S)

FIG. 1 is a diagram of a DC contactor arrangement with two bidirectional contactors in accordance with the disclosure.

FIG. 2*a* shows a diagram of a DC contactor arrangement with two bidirectional contactors in accordance with the disclosure.

FIG. 2*b* shows a diagram of a variant of the DC contactor arrangement with two bidirectional contactors shown in FIG. 2*a*.

FIG. 3*a* shows a diagram of a DC contactor arrangement with a bidirectional contactor and a unidirectional contactor in accordance with the disclosure.

FIG. 3*b* shows a diagram of a first variant of the DC contactor arrangement with two bidirectional contactors in accordance with the disclosure.

FIG. 3*c* shows a diagram of a second variant of DC contactor arrangement with two bidirectional contactors in accordance with the disclosure.

FIG. 3*d* shows a diagram of a third variant of the DC contactor arrangement with two bidirectional contactors in accordance with the disclosure.

DETAILED DESCRIPTION OF THE INVENTION

Corresponding parts are provided with the same reference symbols in all figures.

In the figures, unidirectional DC contactors can be identified by their plus- and minus terminal, indicated by "A+" and "A−". A forward direction is from A+ to A−. Correspondingly, the reverse direction is from A− to A+. Bidirectional DC contactors do not have such designations in the figures.

Figure 1:
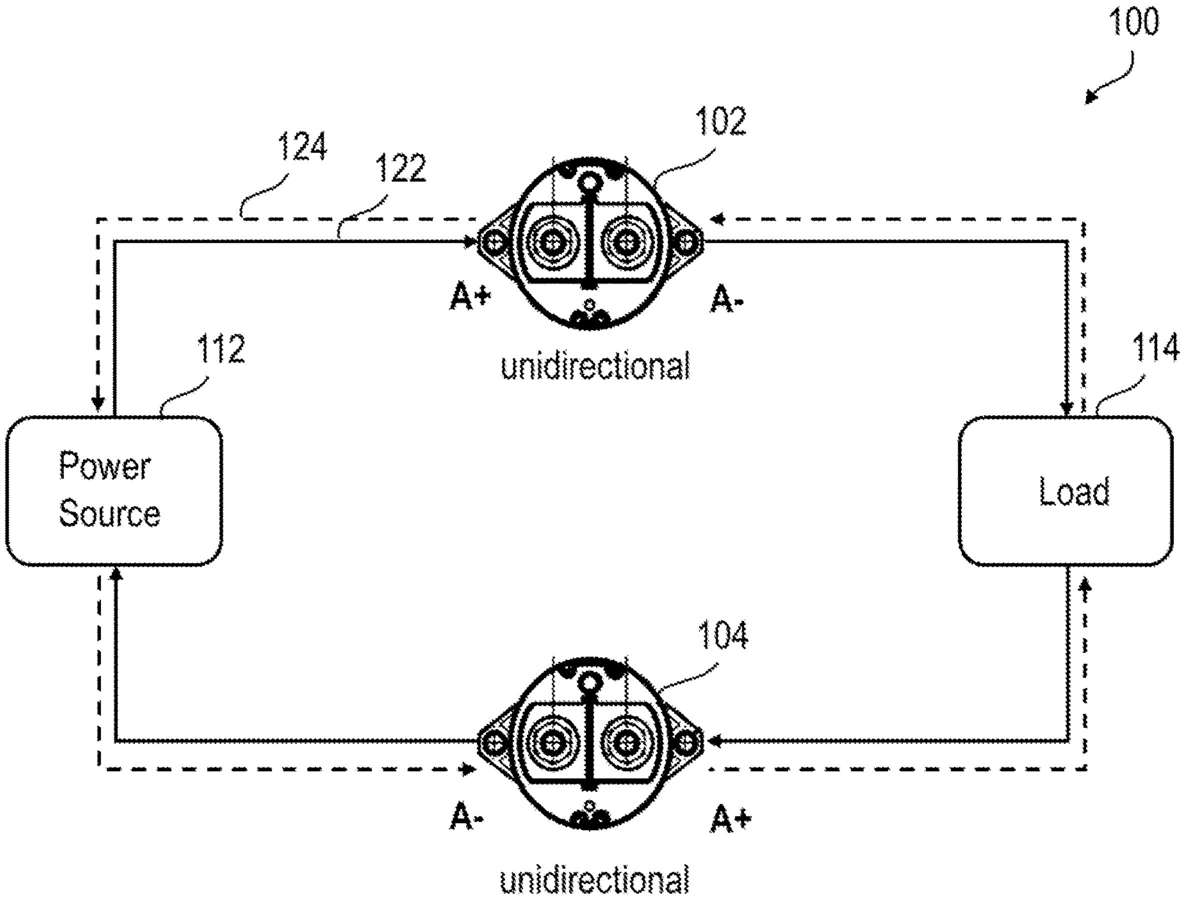

FIG. 1 shows a diagram of a DC contactor arrangement 100 with two unidirectional contactors 102, 104. The unidirectional contactors 102, 104 in the arrangement are configured such that the forward direction of the DC+ contactor 102 is from the power source 112 through the DC+ contactor 102 to the load 114, and the forward direction of the DC− contactor 104 is from the load 114 through the DC− contactor 104 to the power source 112. The DC contactors 102, 104 can therefore be switched, i.e., switched on or off, without damage when the power flows in the forward direction as indicated by the solid arrows 122 and the contactors are under load. However, if the power flows in reverse direction, as indicated by the dashed arrows 124, the contactors 102, 104 would be destroyed if they are switched, e.g., in an emergency case, when they are under load.

Figure 2A:
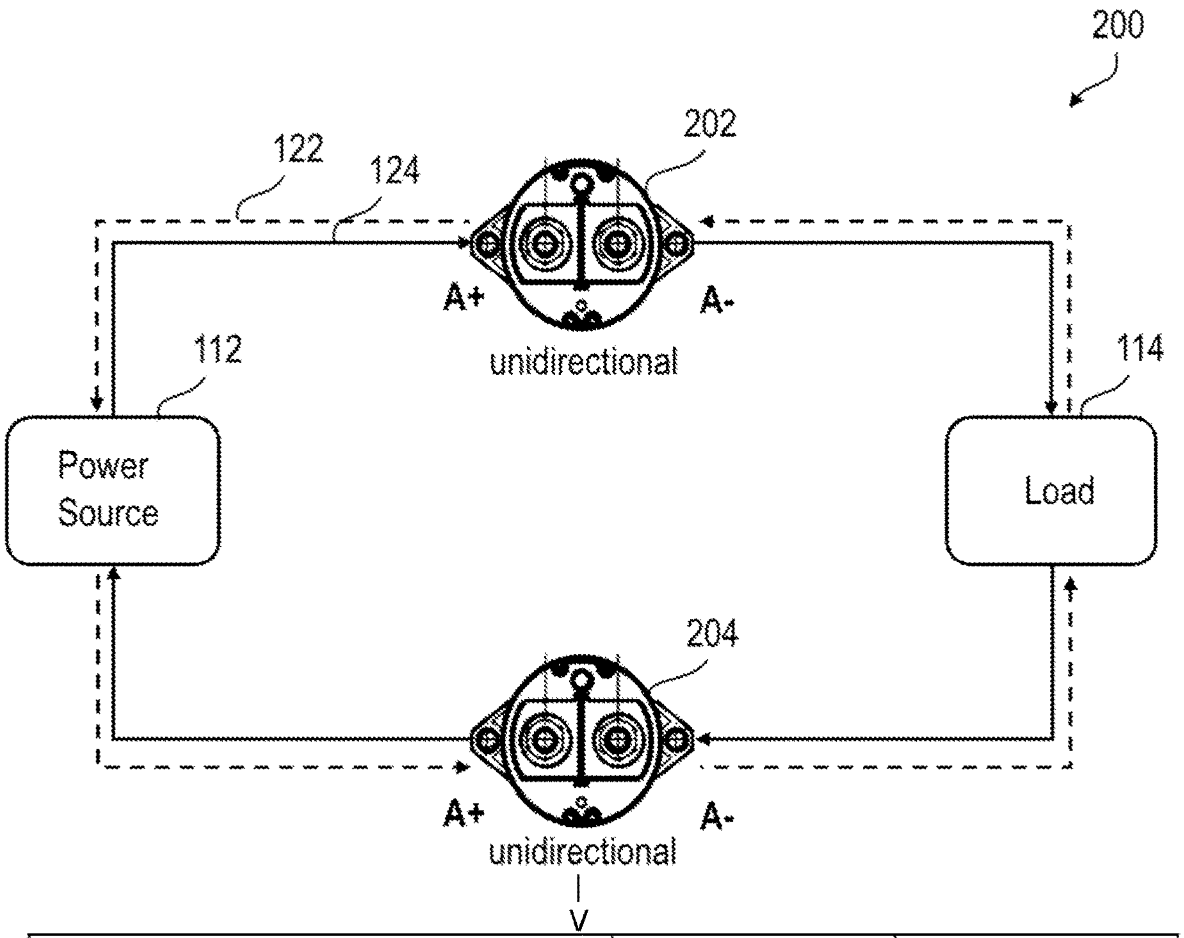
Figure 2B:
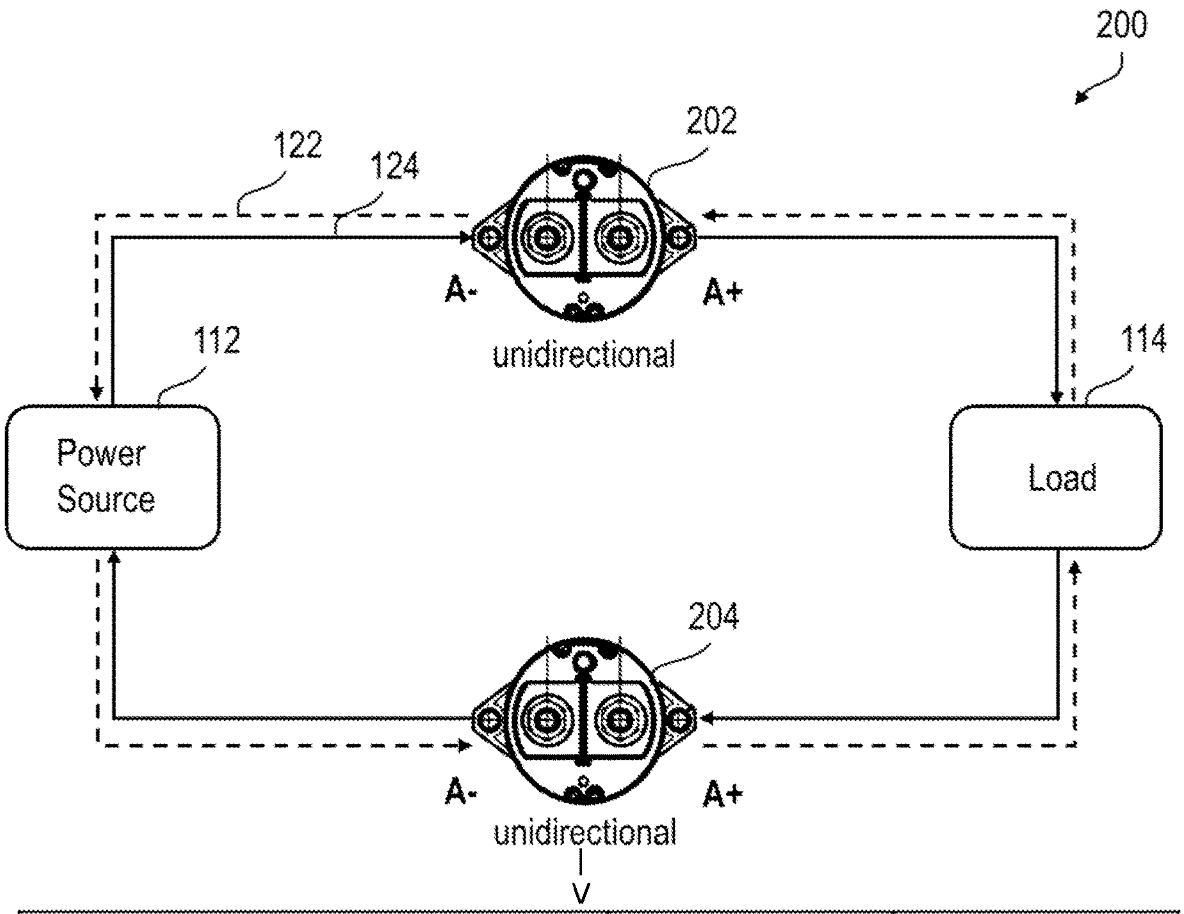

FIGS. 2*a* and 2*b* show diagrams of a DC contactor arrangement 200 with two unidirectional contactors, where the contactors can be switched under load, even when they are operated in reverse direction.

In the arrangement 200 of FIG. 2*a*, this is accomplished by configuring the DC+ contactor 202 such that it is operated in forward direction when a positive power flow is applied; i.e., from the power source 112 via the DC+ contactor 202 to the load 114, and configuring the DC− contactor 204 such that it is operated in reverse direction when a positive power flow is applied; i.e., from the load 114 via the DC− contactor 204 to the power source 112.

Further, the DC contactors are switched sequentially. DC+ contactor 202 is switched first. As soon as consequently the DC− contactor 204 is no longer under load, or at least under high load, DC− contactor 204 is switched. This sequence is shown in the second line of the table in FIG. 2*a*. In case, the DC contactors 202, 204 are to be closed, first the DC− contactor 204 is closed. The still open DC+ contactor 202 impedes that DC− contactor 204 is immediately under load. After DC− contactor 204 has been switched on, DC− contactor 204 is closed as can be seen also from the table in FIG. 2*a*. In the tables of FIGS. 2 and 3, the numbers "1" and "2" represent the sequence, i.e., is switched as first resp. second.

Similarly, in case of a negative power flow, i.e., from the load 114 via the DC+ contactor 202 to the power source 112, which in this case is a power sink, and from the power source 112 via the DC− contactor 204 to the load 114, the DC− contactor 204 is opened first and the DC+ contactor 202 is opened second. When the DC contactors have to be opened, the DC− contactor 204 is opened first and DC+ contactor 202 is opened second. These cases are reflected by the fourth and third lines in the table in FIG. 2*a*.

FIG. 2*b* shows a diagram of a DC contactor arrangement 200 corresponding to that of 2*a*, however wherein the DC contactors are inserted in the circuit 112, 202, 114, 204 in an opposite direction. That is, the DC+ contactor 202 is configured such that it is operated in reverse direction when a positive power flow is applied; i.e., from the power source 112 via the DC+ contactor 202 to the load 114, and such that the DC− contactor 204 is operated in forward direction when a positive power flow is applied; i.e., from the load 114 via the DC− contactor 204 to the power source 112.

As shown in lines 1 to 4 of the table of FIG. 2, in case of a positive power flow, when the contactors have to be closed, first the DC+ contactor 202 and then the DC− contactor 204.

FIGS. 3*a* to 3*d* show diagrams of a DC contactor arrangement 300 with one bidirectional and one unidirectional contactors, where the contactors can be switched under load, even when they are operated in reverse direction.

Figure 3A:
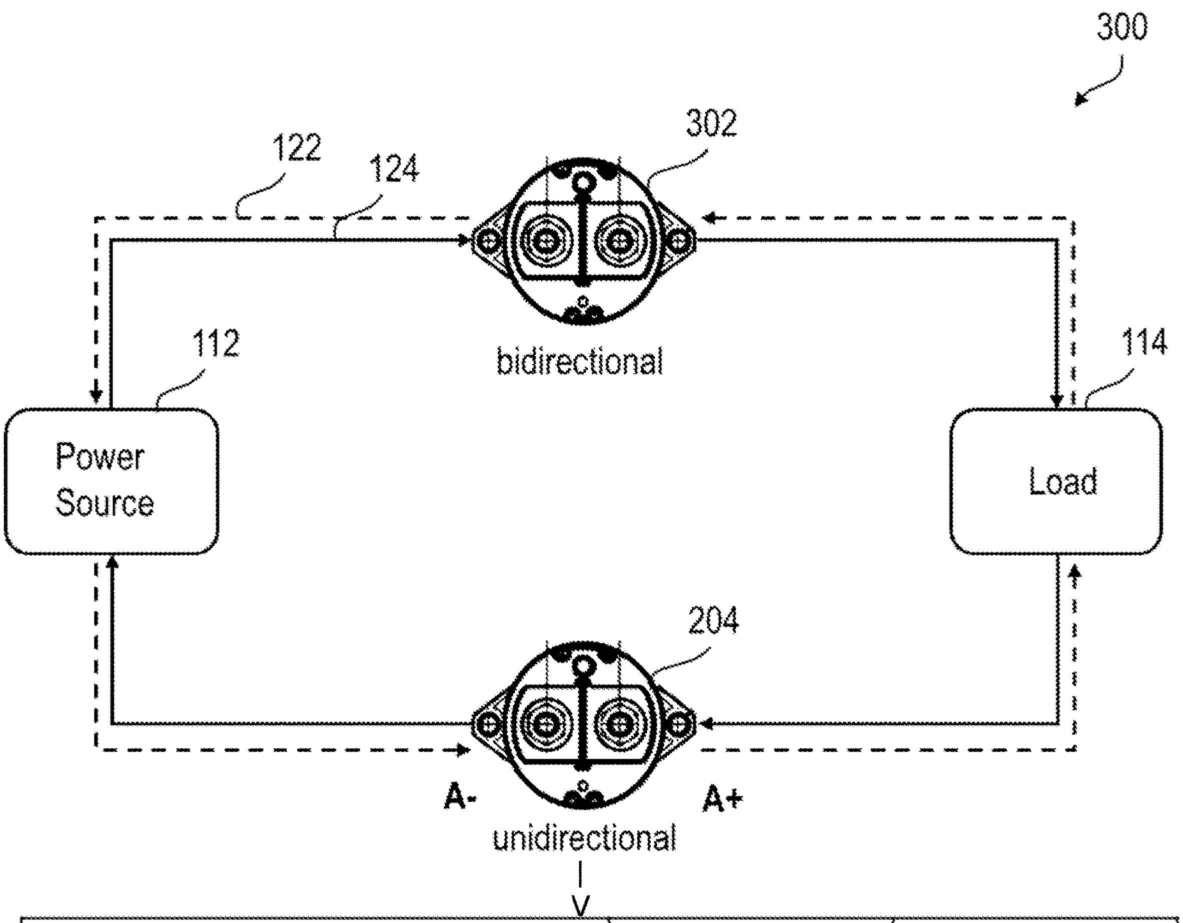

FIG. 3*a* shows a DC contactor arrangement 300 with a bidirectional DC+ contactor 302. Since the unidirectional DC− contactor 204 is configured to conduct the current from the load 114 to the power source 112 in forward direction, none of the contactors is configured in reverse direction at a positive power flow. Therefore, there are no restrictions on the switching sequence, as can also be seen from first two lines of the table in FIG. 3*a*.

Regarding the negative power flow, the same conditions as for the configuration in FIG. 2*b* apply. Therefore, in case of closing the contactors, the DC− contactor 204 has to be closed before the bidirectional contactor 302, such that no current flows through DC− contactor 204 when switching, and in case of opening the contactors, the DC− contactor 204 has to be opened after the bidirectional contactor 302 for the same reason. The sequence is shown in the last two lines of the table in FIG. 3*a*.

Figure 3B:
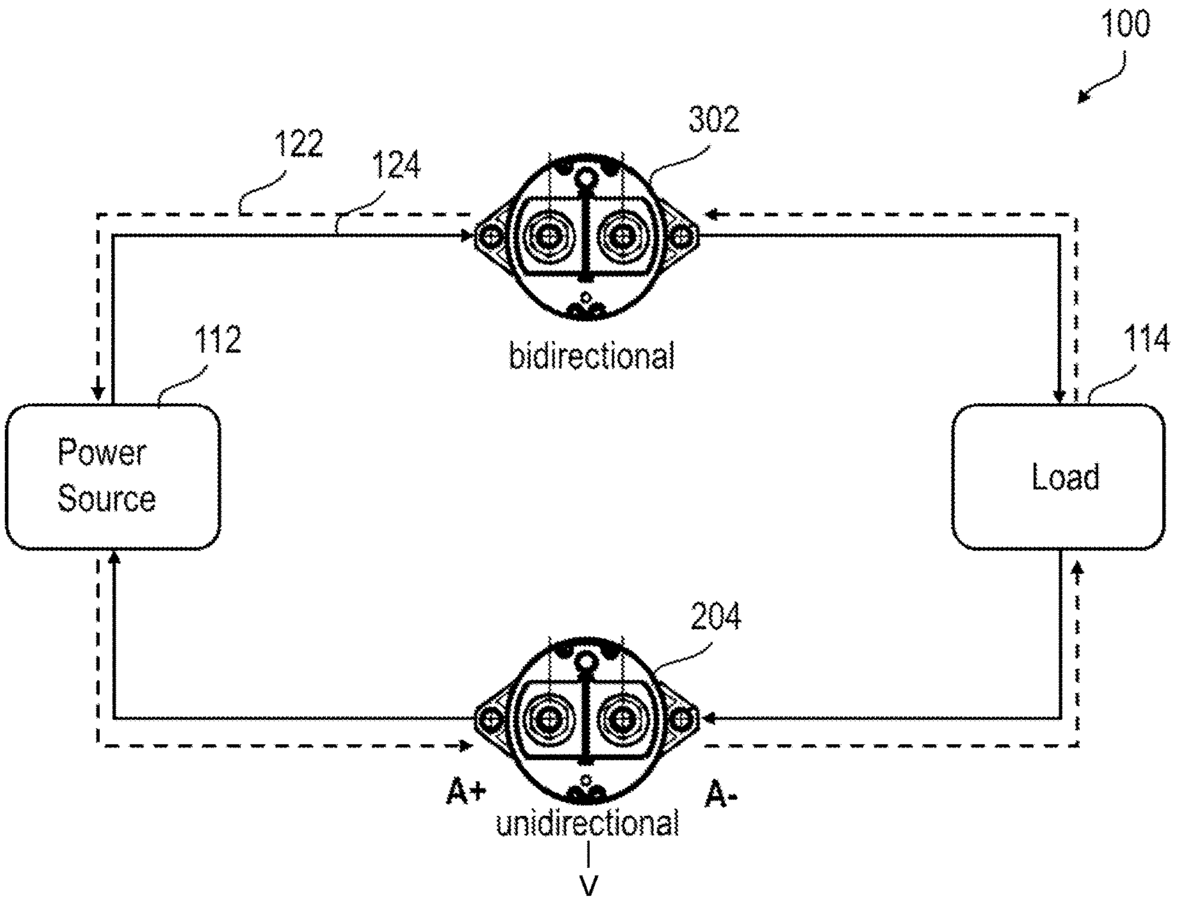
Figure 3C:
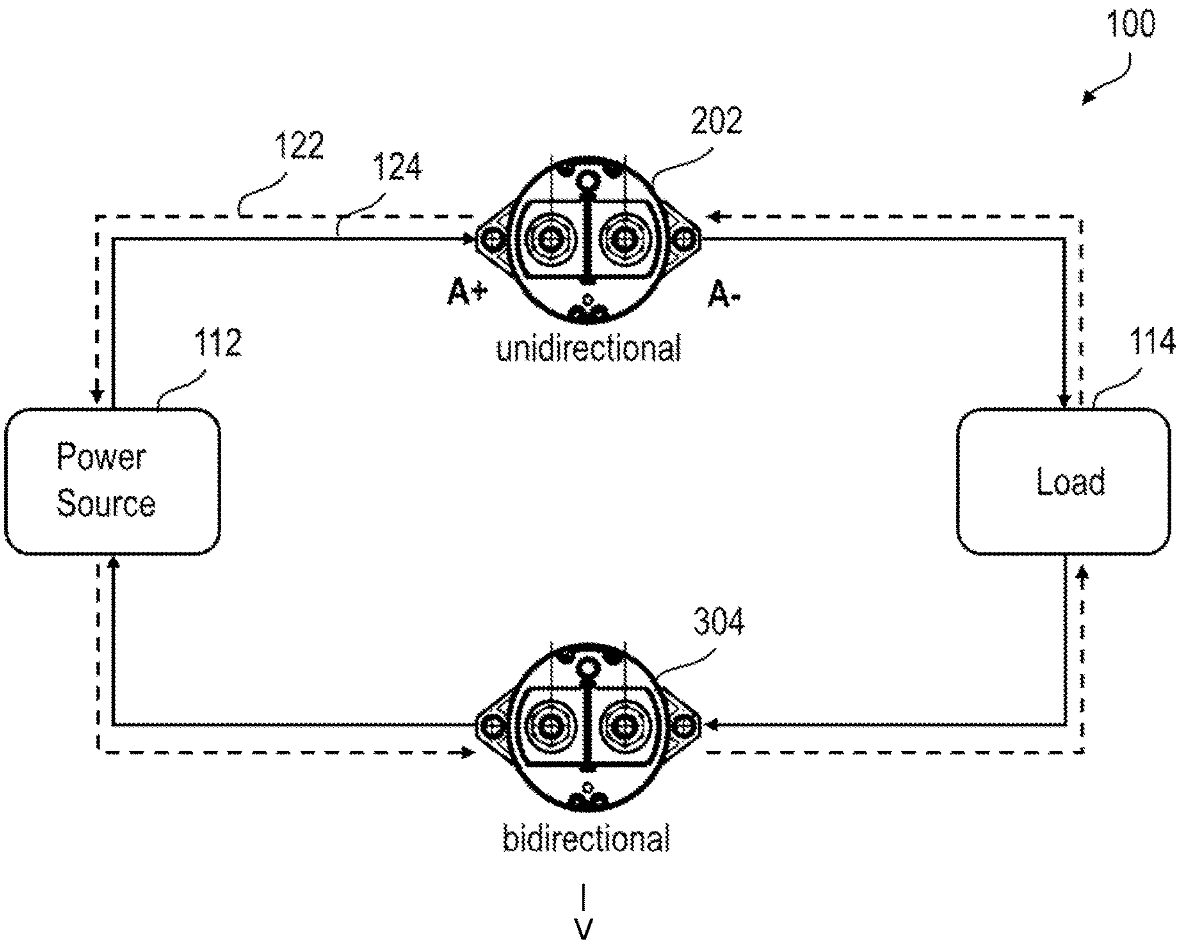
Figure 3D:
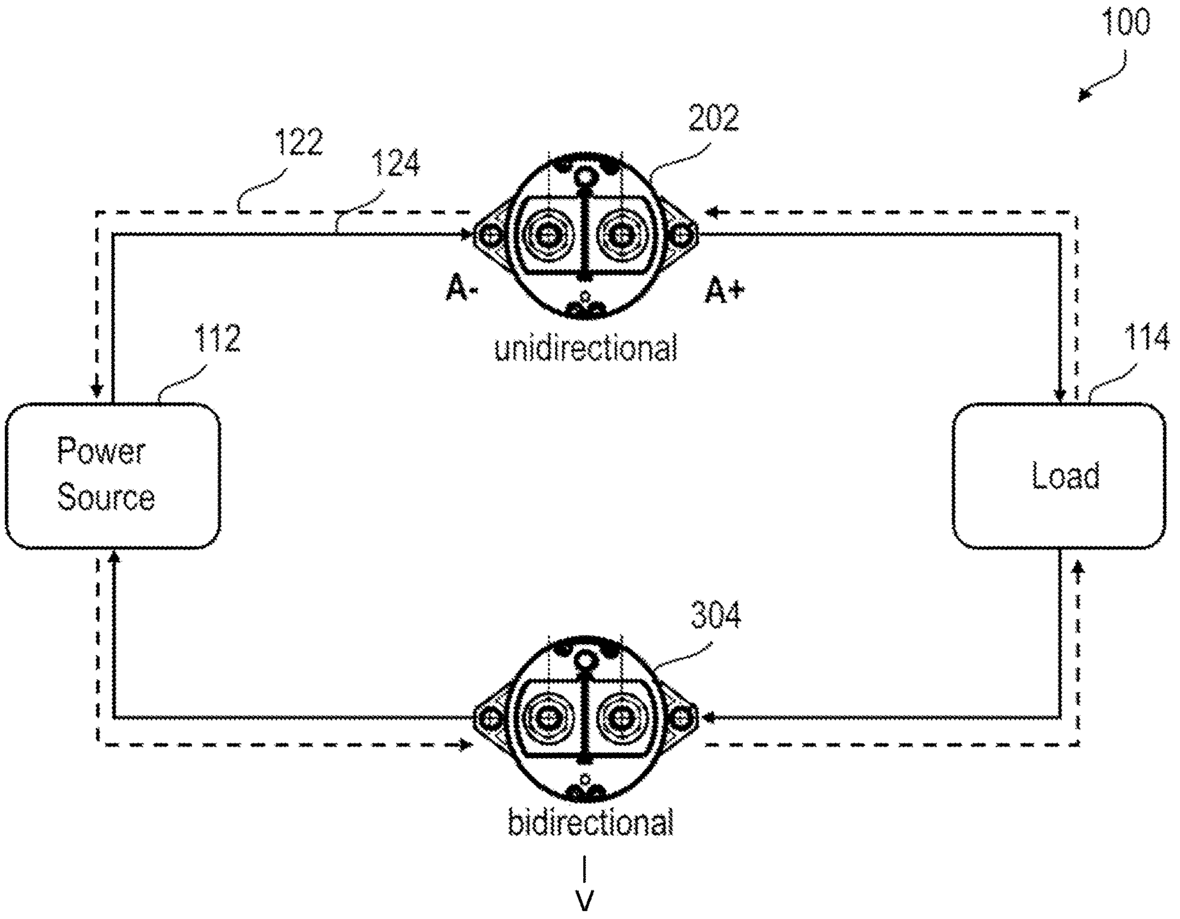

FIGS. 3*b*-3*d* show all variants of the arrangement 300 with a bidirectional- and a unidirectional contactor.

In FIG. 3*b*, the A− terminal of the DC− contactor 204 is connected to the load 114, and the A+ terminal is connected to the power source 112, so that at positive power flow, the unidirectional DC− contactor 204 is operated in reverse direction. Therefore, when the contactors 204, 302 have to be closed, the DC− contactor has to be closed first and thereafter the bidirectional contactor 302 has to be closed. When the contactors have to be opened, the bidirectional contactor 302 has to be opened first and thereafter the DC− contactor 204 has to be opened. For negative power flow, the order in case of closing or opening the contactors 204, 302 does not play a role.

In FIG. 3*c*, the A− terminal of the DC+ contactor 202 is connected to the load 114, and the A+ terminal is connected to the power source 112, so that at negative power flow, the unidirectional DC+ contactor 202 is operated in reverse direction. Therefore, when the contactors 202, 304 have to be closed, the DC+ contactor 202 has to be closed first and thereafter the bidirectional contactor 304. When the contactors 202, 304 have to be opened, the bidirectional contactor 304 has to be opened first and thereafter the DC+ contactor 202. For positive power flow, the order in case of closing or opening the contactors 202, 304 does not play a role.

In FIG. 3*d*, the A+ terminal of the DC+ contactor 202 is connected to the load 114, and the A− terminal is connected to the power source 112, so that at positive power flow, the unidirectional DC+ contactor 202 is operated in reverse direction. Therefore, when the contactors 202, 304 have to be closed, the DC+ contactor 202 has to be closed first and thereafter the bidirectional contactor 304. When the contactors 202, 304 have to be opened, the bidirectional contactor 304 has to be opened first and thereafter the DC+ contactor 202. For negative power flow, the order in case of closing or opening the contactors 202, 304 does not play a role.

The invention provides a cheap, safe and flexible solution to achieve the high current switching capability in both directions in the bidirectional EV chargers.

Figure 4:
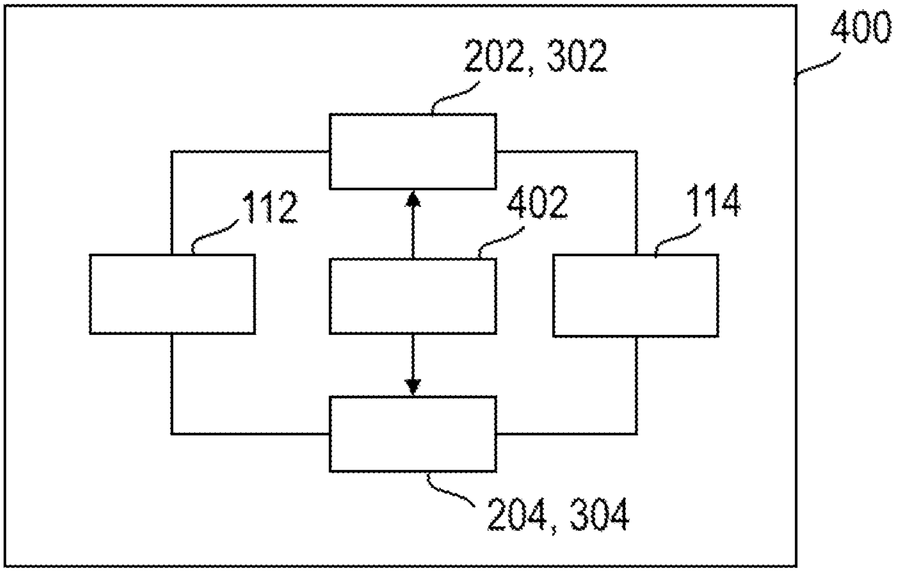
FIG. 4 shows an EV (Electric Vehicle) bidirectional charging system in accordance with the disclosure.

FIG. 4 shows a block diagram with the DC contactor arrangement integrated in an EV bidirectional charging system 400, including a DC+ contactor 202, 302, a DC− contactor 204, 304, a power source 112, a load 114, and a control circuit 402. The control circuit switches the DC+ contactor 202, 302, and the DC− contactor 204, 304 at different times as described herein.

Figure 5:
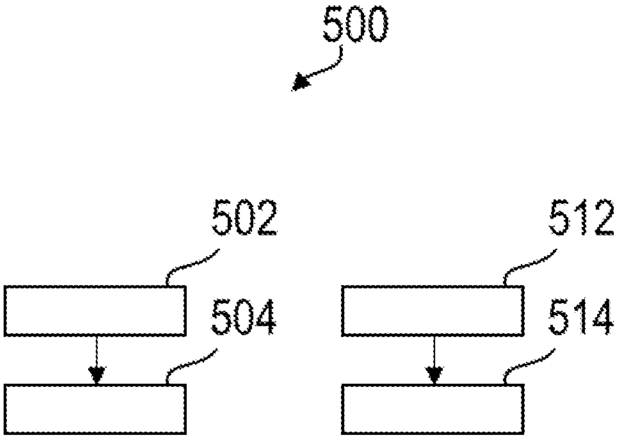
FIG. 5 shows a flow diagram illustrating a method for switching a DC+ contactor in accordance with the disclosure.

FIG. 5 shows a flow diagram illustrating the method 500 for switching a DC+ contactor for connecting a power source with a load and a DC− contactor for connecting the power source with the load in a DC contactor arrangement for bidirectional power switching, wherein at least one of the DC+ contactor or DC− contactor is a unidirectional DC contactor.

The method 500 comprises the step (502, 504; 512, 514) switching, the DC+ contactor and the DC− contactor at different times, when the DC+ contactor and the DC− contactor are under load. In particular, in case the high current is flowing and the DC contactors have to be switched off, in sub-step 502 the DC contactor, through which the current flows in forward direction is switched off. In case that one DC contactor is bidirectional, this may the bidirectional DC contactor. When the current is decreased sufficiently or stopped, in sub-step 504, the DC contactor, which is or has been operated in reverse direction, is switched off. Correspondingly, when the DC contactors shall be switched on, in sub-step 512, first the DC contactor that will be operated in reverse direction is switched on, and after a, for example, pre-defined time span, the DC contactor in forward direction is switched on. In case that one DC contactor is bidirectional, this may the bidirectional DC contactor.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

According to an embodiment, a minimum time span for the different times between the switching of the DC+ and DC− contactors is defined by a first threshold current through the DC contactor that is switched later in case of the switching is switch-off; or by a second threshold current through the DC contactor that is switched first in case of the switching is switch-on.

Since the unidirectional contactor may be switched at low currents without getting damaged, a threshold may be defined that is based on an allowed current in the switch-off case. The minimum time span is therefore not directly defined as a fix or pre-defined interval, but as the time until the allowed current is reached. The resulting time span may therefore differ from application to application and even from charging session to charging session.

In the switch-on case, it has to be assured that the contact inside the contactor is stable. Therefore, for the switch-on case, the minimum time span may be a defined as a threshold in terms of time. The minimum time span may be a pre-defined, and depend rather on the DC contactor or based on typical contactor characteristics than on operation conditions.

According to an embodiment, the threshold current is zero. According to an embodiment, when the switching is switch-off, the DC contactor, which is switched later, is operated in reverse direction.

When switching off, it has to be assured that the DC contactor that is operated in reverse direction, is switched off without load. Therefore, the first DC contactor to switch is the one, which is either operated in forward direction or which is a bidirectional switch.

According to an embodiment, when the switching is switch-on, the DC switch, which is switched later, is operated in forward direction.

When switching on, it has to be assured that the DC contactor that is operated in reverse direction, is switched on before load is applied. Therefore, it has to be switched before the DC contactor operated in forward direction or the bidirectional DC contactor.

According to an embodiment, the DC+ contactor and the DC− contactor are unidirectional DC− contactors, and wherein the DC contactor, which is switched-on first, is operated in reverse direction.

In this embodiment and the following embodiment, both DC contactors are unidirectional. Strictly speaking, in the moment, where, the signal is sent to switch the contactor on, the contactor does not yet guide a current. Therefore, it is not operated in any direction in terms of current flow. However, the term "is operated" shall be interpreted as "will be operated" in this context herein.

According to an embodiment, the DC+ contactor and the DC− contactor are unidirectional DC− contactors, and wherein the DC switch, which is switched-off first, is operated in forward direction.

According to an embodiment, one of the DC contactors is a unidirectional contactor configured to be operated in reverse or in forward direction, and one of the DC contactors is a bidirectional contactor.

In this embodiment, only one DC contactor is unidirectional. When the unidirectional contactor is operated in forward direction, and the other contactor is a bidirectional contactor, the sequence does not matter. However, the contactors may nevertheless switch at different times. By switching at different times as described herein, the unidirectional contactor can also be operated in reverse direction.

According to an embodiment, the DC contactor arrangement further comprises a control circuit configured for generating a signal for switching the DC+ contactor and the DC− contactor.

The control circuit may be a circuit that receives an input signal from a user or from a further control circuit, from sensors, especially current detection circuits, etc. The control circuit outputs a signal that is capable to perform the switching. The control circuit may comprise digital and/or analog devices, may be completely analog, completely digital or a mix of analog and digital. It may further comprise programmable devices and/or logic devices.

According to a further aspect, an EV (Electric Vehicle) bidirectional charging system comprising a DC contactor arrangement as described herein is provided.

According to a further aspect, a method for switching a DC+ contactor for connecting a power source with a load and a DC− contactor for connecting the power source with the load in a DC contactor arrangement for bidirectional power switching is provided, wherein at least one of the DC+ contactor or DC− contactor is a unidirectional DC contactor. The method comprises the step switching, the DC+ contactor and the DC− contactor at different times, when the DC+ contactor and the DC− contactor are under load.

According to a further aspect, a use of a unidirectional contactor in a DC contactor arrangement for bidirectional power switching as described herein for switching is provided.

According to a further aspect, a use of the DC contactor arrangement as described herein in an electric vehicle charging system or an energy system is provided.

The DC contactor arrangement may be used in further applications where high currents are switched and where the current may flow in both directions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE NUMERALS

100 DC connector arrangement with unidirectional contactors
102 unidirectional DC+ contactor
104 unidirectional DC− contactor
112 Power source
114 Load
122 positive power flow
124 negative power flow
200 DC connector arrangement with unidirectional contactors
202 unidirectional DC+ contactor
204 unidirectional DC− contactor
222 positive power flow
224 negative power flow
300 DC connector arrangement with one unidirectional contactor and one bidirectional DC contactor
302 bidirectional DC+ contactor
304 bidirectional DC− contactor
400 EV charging system
402 Control circuit
500 Method
502 . . . 514 Method steps

What is claimed is:

1. A direct current (DC) contactor arrangement for bidirectional power switching, comprising:
a DC+ contactor for connecting a power source with a load; and
a DC− contactor for connecting the power source with the load;
wherein at least one of the DC+ contactor or the DC− contactor is a unidirectional DC contactor configured to control high current flow in a pre-defined direction; and
wherein the DC+ contactor and the DC− contactor are configured to be switched off at different times, when the DC+ contactor and the DC− contactor are under load.

2. The DC contactor arrangement according to claim 1, wherein a minimum time span for the different times between the switching of the DC+ and DC− contactors is defined by a threshold current through the DC contactor that is switched later in case of the switching is switch-off; or by a pre-defined time span in case of the switching is switch-on.

3. The DC contactor arrangement according to claim 2, wherein the threshold current is zero.

4. The DC contactor arrangement according to claim 1, wherein, when the switching is switch-off, the DC switch, which is switched later, is operated in reverse direction.

5. The DC contactor arrangement according to claim 4, wherein, when the switching is switch-on, the DC switch, which is switched later, is operated in forward direction.

6. The DC contactor arrangement according to claim 5, wherein the DC+ contactor and the DC− contactor are unidirectional DC contactors, and wherein the DC contactor, which is switched first, is operated in reverse direction.

7. The DC contactor arrangement according to claim 6, wherein the DC+ contactor and the DC− contactor are unidirectional DC contactors, and wherein the DC contactor, which is switched first, is operated in forward direction.

8. The DC contactor arrangement according to claim 1, wherein one of the DC contactors is a unidirectional contactor configured to be operated in reverse or in forward direction, and one of the DC contactors is a bidirectional contactor.

9. The DC contactor arrangement according to claim 1, wherein the DC contactor arrangement further comprises a control circuit configured for generating a signal for switching the DC+ contactor and the DC− contactor.

10. A method for switching a DC+ contactor for connecting a power source with a load and a DC− contactor for connecting the power source with the load in a DC contactor arrangement for bidirectional power switching, comprising:
providing at least one of the DC+ contactor or the DC− contactor as a unidirectional DC contactor configured to control high current flow in a pre-defined direction; and
switching off the DC+ contactor and the DC− contactor at different times, when the DC+ contactor and the DC− contactor are under load.

11. The DC contactor arrangement according to claim 1, wherein the unidirectional DC contactor switches on and off high current in only the pre-defined direction without damage.

12. The DC contactor arrangement according to claim 1, wherein a minimum time span for the different times is defined by a threshold current through one of the DC+ contactor and the DC− contactor that is switched later to switch-off.

* * * * *